United States Patent [19]

Feldstein

[11] Patent Number: 5,629,601
[45] Date of Patent: May 13, 1997

[54] COMPOUND BATTERY CHARGING SYSTEM

[76] Inventor: Robert S. Feldstein, 4 Clinton Ave., Dobbs Ferry, N.Y. 10522

[21] Appl. No.: 228,874

[22] Filed: Apr. 18, 1994

[51] Int. Cl.$^6$ ................................................ H01M 10/46
[52] U.S. Cl. ................................ 320/6; 320/15; 320/23
[58] Field of Search ........................... 320/5, 6, 15, 16, 320/17, 18, 19, 20, 22, 23, 24

[56] References Cited

U.S. PATENT DOCUMENTS

| | | |
|---|---|---|
| 4,331,911 | 5/1982 | Park ........................................ 320/14 |
| 5,003,244 | 3/1991 | Davis, Jr. ................................. 320/17 |
| 5,162,663 | 11/1992 | Combs et al. ........................... 307/29 |
| 5,523,668 | 6/1996 | Feldstein ................................. 320/6 |

Primary Examiner—Edward H. Tso
Attorney, Agent, or Firm—Howard M. Cohn

[57] ABSTRACT

Apparatus and methods for charging a string of serially connected batteries. A system charger is connected across the string of batteries to charge the batteries to a percentage of full charge capacity. Then, individual battery chargers independently charge each of the batteries to full charge capacity.

32 Claims, 4 Drawing Sheets

COMPOUND BATTERY CHARGING SYSTEM

CROSS-REFERENCE TO RELATED APPLICATIONS

This application is related to U.S. application Ser. No. 08/228,341, filed Apr. 15, 1994, by Robert Feldstein for MAGNETICALLY BALANCED MULTI-OUTPUT BATTERY CHARGING SYSTEM and U.S. application Ser. No. 08/228,393, filed Apr. 15, 1994, by Robert Feldstein for NICD and NIMH BATTERY CHARGING SYSTEM.

FIELD OF THE INVENTION

This invention relates to the field of battery charging and more particularly, to an apparatus and method for quickly and safely recharging a series of batteries to their full charge capacity with a relatively low cost, rugged, efficient, battery charging system.

BACKGROUND OF THE INVENTION

Despite the decades of experience with the design of chargers for lead acid batteries, a number of practical limitations on system performance have not been effectively or economically addressed. These limitations relate to specific parameters associated with cells, batteries, and/or battery assemblies (a group of serially connected batteries). The following discussion focuses on these specific parameters and how they effect the cells, batteries, and battery assemblies.

The problems with cells and batteries are essentially the same since a battery is a group of combined cells and are referred to as cells and/or batteries herein. These problems concern charging rate limits (the speed with which a cell or battery can be charged without causing damage to the cell structure), float life limits (the length of time a cell or battery remains charged while inactive) and cyclic effects (the number of times a cell can be recharged to a suitable capacity). Battery system problems include the effects of differential capacity (different cells and/or batteries in a series assembly having different capacity) and differential evolution (individual cells and/or batteries in a series assembly deteriorating at different rates) in cells and batteries which are members of a series "string".

With problems relating to both cell and battery systems, a major difference in emphasis results from the application in which they are employed. For example, standby power systems (such as telecommunications back up power systems) differ significantly from cyclic power systems (such as power systems for traction devices) which undergo a deep cycle (routinely discharged to a low level) or load leveling (routinely discharged to a shallow cycle). The construction of cells differ in many ways, depending on the type of service for which the cell is intended.

The following discussion begins with the problems relating to cells, progresses to batteries, and then to battery systems. The examples are provided to illustrate preferred methods of achieving improved performance at acceptable cost. The cost/performance trade-offs will vary with the application and the risk associated with unsatisfactory battery performance.

An individual lead acid cell may be flat plate, rolled plate, thin or thick, jar or tank formed, starved, gelled or flooded, sealed or unsealed and may have a variety of alloying agents, electrolyte additives and construction variants, i.e., separators, expanders, float energy or power density, cyclic or float life, deep or shallow service, economy or durability and so on.

The basic system still requires the passage of a net charging current in the reverse direction from discharge to recharge the cell. This requires both an excess voltage (over the equilibrium open circuit voltage) to achieve significant cell current, especially at high state-of-charge, and excess charge (current times time) to compensate for the less than 100% charge storage efficiency of the cell. Many parameters of cell construction, including plate alloying additives, active material porosity, electrolytic composition, specific gravity, and volume mobility, affect overvoltage requirements, voltage, charge efficiency, and the effect of charge rate (at a given state-of-charge) on cell life and recoverable capacity.

Generally, the ability of a cell to absorb charging current efficiently, without requiring a large voltage excess and with high charge storage efficiency, declines as the state-of-charge increases. The "C" rating is defined as the current rating in amps times the number of hours required to discharge a battery. The number of required hours or rating purposes varies with battery type and manufacturer. A 1C charge rate into a battery that is at 10% of its full state-of-charge is harmless for virtually any cell construction. However, the same charge rate into a battery having a 90% state-of-charge necessitates substantial overvoltage, reduced charge storage efficiency, generation of significant cell heating, possibly local gassing and, in many cell structures, significant non-uniformities over the plate surfaces. These non-uniformities can cause substantial local morphological variations especially in the positive plate oxide of a lead acid battery, and can cause stratification effects in tall vertical plates (above about 10 inches).

One means of partially overcoming certain of the previously mentioned deficiencies resulting from charging batteries having a high state-of-charge is the use of reverse (discharge) current pulses interspersed in the charging current. Reverse current pulses are categorized as long, short, and very short in duration. They tend to enhance charge acceptance, especially at high states-of-charge, by lowering the "barrier" height (the amount of excess voltage needed for charge acceptance) and increasing the efficiency of the net recharge energy by reducing cell heating from moderate rate, late stage, charging conditions. The reverse current pulses have been used as an aid in "quick charging" lead acid batteries for decades. However, the use of reverse current pulses, both long and short, fall short of overcoming the limitations in battery charging discussed before.

The use of very short (in duration) reverse current pulses in the range of milliseconds for lead acid batteries has only a modest effect on lowering barrier height and relatively little effect on charge acceptance. This is because the improvement in charge acceptance during current flow in the "forward" or charging direction must exceed the "reverse" or discharge loss from the "reverse" pulse currents.

For short pulses in the range of seconds (but still very short compared to the cell step function equilibrium time, which itself depends on the state-of-charge and cell construction), little internal reactant redistribution is created, especially when the reverse pulse currents are comparable in magnitude to the charging current. However, small scale anomalies in conductivity, concentration, etc., tend to spontaneously disappear over time under these conditions. For example, a small high conductivity plate region which selectively concentrates charging current and thereby enhances local oxide evolution in a lead acid cell, would be likely to provide an enhanced current density during discharge as well as compensating a typical efficiency in the reverse direction.

Obviously, the net charge and discharge can't balance if the battery is to be recharged, and short reverse current pulses will cancel a portion of the charging current. The macroscopic cancellation does not operate efficiently at small dimensions as evidenced by the net increase in charging current for a given charging voltage, despite the current "loss" from the reverse pulses. The net effect of short, moderate current, reverse pulses is generally believed to improve plate uniformity (spatially) and retard oxide morphology evolution in both cyclic and standby systems. There is, however, evidence which indicates that the use of short pulse alone, without any other reverse pulse patterns, can give rise to a plate surface morphology which differs from any stage in the normal "aging" cycle and may enhance the formation of dendrites on the cell surfaces, and may slowly reduce the capacity of the cell.

Long (in duration) reverse current pulses, between about 1 and 15 seconds for lead acid cells, can also be incorporated in the charging system, as generally described before. The long reverse pulses are long in duration compared to the initial step function response time of virtually all lead acid cells under most state-of-charge conditions. The long reverse pulses at moderate current, generally below 1C and typically below C/10, cause re-equilibrium within the cell (which could be provided by a prolonged zero current "rest" state at significantly higher efficiency) and reverses reactive gradients within the electrolyte. The efficient dissolution of dendrites plus the reversal of anomalies over physically large ranges (many inches) helps maintain cell uniformity and tends to reduce cell aging from a "worst case" rate to a "typical" rate. In addition, the use of long reverse pulses on a long standby basis appears to reverse some cell inhomogeneities, such as sulfation "patches" caused by prolonged storage. Still another possible advantage of these long reverse pulses is the partial restoration of compromised cell capacity. As a practical matter, long reverse pulses must be used sparingly, both to conserve charge time and to limit the "make-up" demands on the charger. Interpulse periods in the order of minutes are generally appropriate for lead acid cells.

While it is possible to store and use the energy withdrawn from a cell (or battery) by either short or long reverse pulses, the cost of energy reclamation is usually not justified by the monetary value of the reclaimed energy, and the reduced reliability of the charger resulting from its increased complexity. Since the heat generated by this dissipation of energy is primarily external to the cell, it does not cause significant degradation.

"Rest" periods with no current flow can also improve battery characteristics. In cyclic battery service, there is generally little opportunity to introduce long rest periods since they require more rapid charging due to the typically limited time in which they are recharged. Even in standby battery applications, where long rest periods (in the range of minutes to hours) efficiently and economically reduce the diffusion gradient normal to plate surfaces, they do not reduce gradients parallel to plate surfaces. Therefore, stratification effects are generally not mitigated by zero current rest intervals. Also, even when using rest periods, it may be desirable to cause mechanical mixing by including very high reverse pulses to induce local temperature anomalies and thermal diffusion, or even brief very high current charging pulses to introduce gas bubbles throughout the system, especially in lead acid cells larger than about 100 Ampere-Hours (AH) per plate.

The range of effects which can be manipulated by the duration, current, and repetition rate of one or more reverse current pulse patterns, both short and long, are numerous. The previous examples illustrate a relatively simple way in which some of the choices can be economically implemented. Furthermore, serious loss of capacity mechanisms which become more noticeable toward the end of battery service life, such as plate sulfation, are effectively reduced by a multiple, reverse pulse environment. This can be an economical advantage since it delays battery replacement.

In expanding this discussion from cells to batteries (a small group of series connected cells—typically 3 or 6 cells in a lead acid type battery), effects resulting from cell differences, both initially and during operation, become significant. Cells can initially differ in both their capacity and recharge efficiency. Additional cell differences arise due to differential aging of batteries used in both cyclic and float service applications.

Equilibrium charging rates depend on the small recombinant capacity of lead acid systems (especially sealed, starved electrolyte systems) which generally have a limit of about C/200. Therefore, a small continuous "trickle" current can effectively "complete" the charging of larger capacity cells in a series group. This is necessary because the "smallest" cells reach full charge first and raise the series string voltage to the charger cut-off limit before the larger capacity cells reach full charge. The trickle current, on the other hand, allows each cell to eventually reach full charge. Of course, the trickle current must be larger than the self discharge current, which is typically about C/5000 to C/1000 depending on the cell construction and its operating temperature.

The difference between trickle current and self discharge current must be dealt with by recombination (or made up in refillable cells). By improving cell surface uniformity and reducing gradients, the self discharge currents and the required trickle current tend to be minimized, and the resultant recombinant capacity, i.e. the ability of the cell to receive current forever, is minimized. Recombinant behavior is never perfect and leads to gas loss and consequent "drying".

Many battery systems contain long series of connected groups of batteries. All of the aforementioned problems with cells and single batteries are compounded in battery systems, especially since the differences between batteries tend to initially be larger and to grow exponentially as compared with the differences between cells in the same battery.

Long strings and/or systems with large cyclic requirements and "deep cycle" demands (discharging daily to as high as 85% of full charge in traction battery applications) may cause catastrophic consequences as the initial battery differences tend to grow with use. For example, a 120 volt standby power system consisting of ten 12 V lead acid batteries, each with 6 cells in series, is subjected to discharge to 1.6 V per cell, i.e., a total discharge to 96 volts. The smallest cells (of the 60 in series) will be discharged well below 1.6 V and may even reach zero or be reversed before load cut-off occurs. This will reduce cell capacity slightly but permanently, because cells tend to be damaged from extreme discharge. On recharge, the smallest cells will be somewhat overcharged before the total series assembly reaches high charge cut-off (at typically 2.3 V/cell) at 138 V. Some water loss will inevitably occur raising the specific gravity of the electrolyte and increasing local current activity and corrosion. With each cycle, the smallest cell will "shrink" more than the largest cells and the trickle current will become a larger fraction of the actual cell capacity and shrinking recombinant limit. Eventually, the trickle current will approach the recombinant limit and rapid deterioration will follow because the extra charge current which is not compensated for by recombination will cause effects such as heating, corrosion, gas release, and decomposition of reactants.

This situation cannot be effectively improved by reducing the overall charging voltage, since this will place the largest cells in an undercharged condition at the end of high charge. The trickle charge which is only on for a limited period of time between battery usage in many applications, can generally not make up for a large deficiency in the charge capacity quickly enough to avoid undesirable changes in both plate small scale structures. The introduction of periodic "equalization" charges, i.e., controlled overcharge, tends to aggravate the situation for the "smaller" cells while improving the condition of the larger cells.

The traditional "high performance" solution has been "group charging" where the series assembly is divided into subgroups, each provided with a separate charger. This may be as simple as one charger per 24 or 48 volt subgroup or as sophisticated as one charger per cell. While the results can be excellent, the cost is prohibitive for most applications, and the added complexity of the multiple systems can reduce reliability unless stringent quality control is imposed, further increasing cost.

In a traction battery system, a somewhat different type of problem than discussed with standby systems occurs. In this application, battery groups of typically 36 or 48 volts are 85% discharged in 16 hours and must be recharged in 8 hours daily. Discharge becomes damaging as the gradual reduction of cell capacity leads to discharge approaching 100% for the smallest cells. Rapid recharge requires sufficient current to assure full recharge of the largest cell within the allowed time. Therefore, the bulk of the cells (and possibly all of them late in life) are overcharged daily. This results in significant water loss which must be made up and generally precludes the use of sealed cells for this application. Flooded cells requiring continuous maintenance are the rule in this application, which has permitted crude, brute force chargers (which are economical and rugged but heavy, inefficient, and inaccurate) to flourish. Here again, while a charger per battery or cell would greatly improve performance, it would be at a cost and level of complexity, inappropriate to the field.

A serious need exits to provide a charging system which addresses the majority of the issues in lead acid charging without affecting the battery construction. Its design must provide the flexibility to economically apply those functions required for each specific application.

OBJECTS AND SUMMARY OF THE INVENTION

It is an object of the present invention to provide a compound battery charging system and method of operating the system which obviates the problems and limitations of the prior art systems.

It is a further object of the present invention to provide a compound battery charging system and method of operating the system whereby the entire string of batteries are charged to a predetermined capacity and then each individual battery or string of batteries is subsequently charged at a slower rate up to full charge.

It is still a further object of the present invention to provide a compound battery charging system and method of operating the system for quickly and safely recharging a series of batteries to their full charge capacity with a relatively low cost, rugged, efficient, battery charging system.

In accordance with the invention, there is provided a compound battery charger system and method of operating the system for charging a string of batteries serially connected to each other (at junctions between each of the batteries). The design contains system charger means connected across the string of batteries for charging the string of batteries in response to the overall voltage across the string of batteries. In addition, individual charger means are connected to the junctions between each of the batteries or battery subgroups for independently charging each of the batteries or battery subgroups in response to the voltage across each of the batteries or battery subgroups.

Further in accordance with the invention, the system charging means for the charging the string of batteries includes first control means for delivering a restricted charging current to the string of batteries whenever the overall voltage across the string of batteries is below a first value corresponding to below typically 70% of the battery strings cut-off voltage above a second value corresponding 100% of the string of batteries system cut-off voltage. The first control means also delivers a full charging current to the string of batteries whenever the overall voltage across the string of batteries is at any third value above the first value and below the second value.

Also, in accordance with the invention, a second control means independently delivers restricted charging current to individual batteries or battery subgroups whenever the voltage across an individual battery or subgroup is at a fourth value below about 70% of that battery's full charge voltage. Further, the second control means delivers substantial charging current to an individual battery or subgroup whenever the voltage across that battery or subgroup is at a fifth value above the fourth value and below that battery's (or subgroup's) full charge voltage.

Also in accordance with the invention, a third control means is provided for shutting off the individual charging means for a time interval corresponding to the time interval that the system charging means is partially discharging the string of batteries.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

FIGA. 3a & 3b are a schematic diagram of the same "system charger"; and

Figure 4:
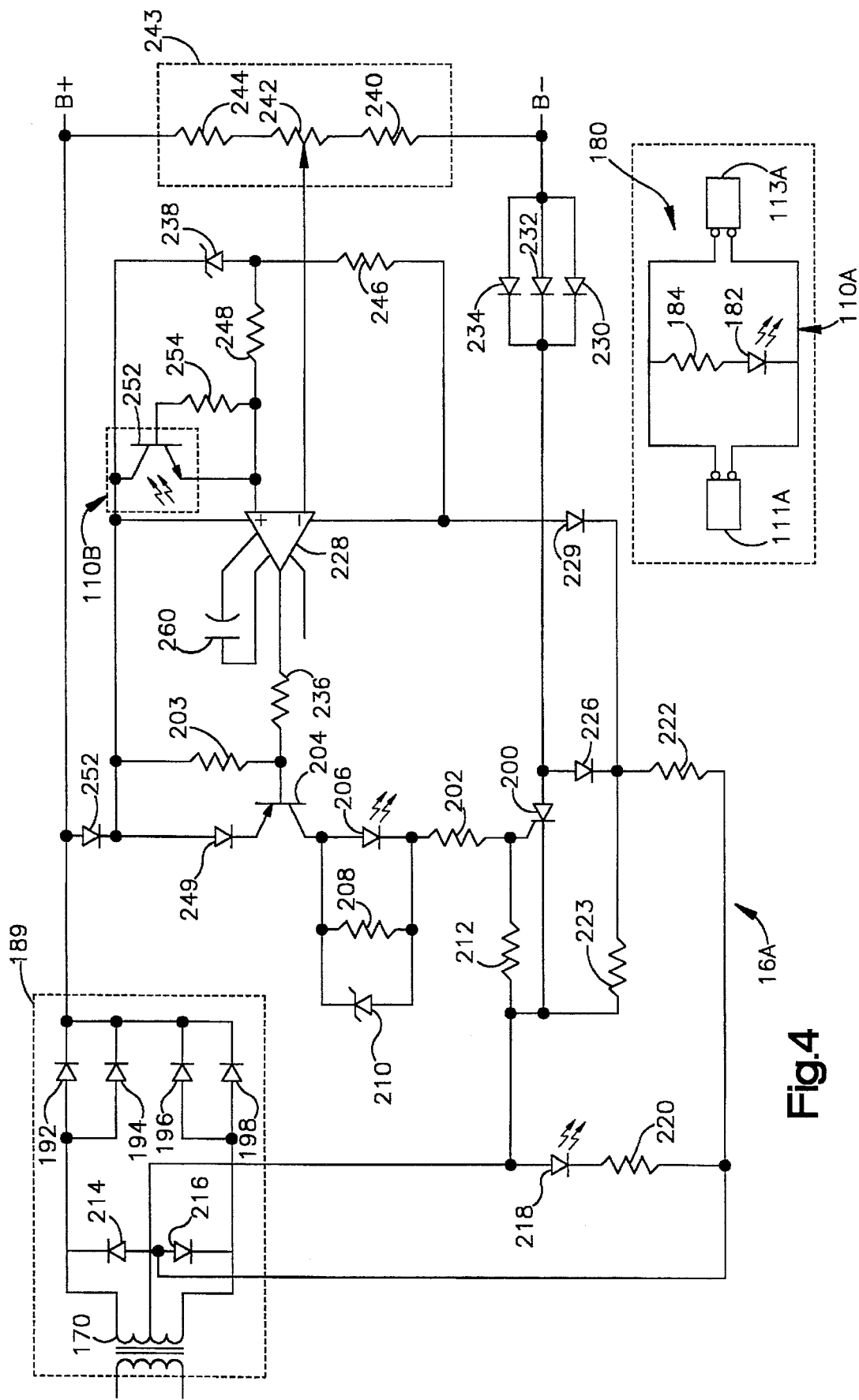

FIG. 4 is a circuit diagram of an individual "battery charger" in accordance with the present invention.

DETAILED DESCRIPTION OF THE INVENTION

Figures 1, 3A:
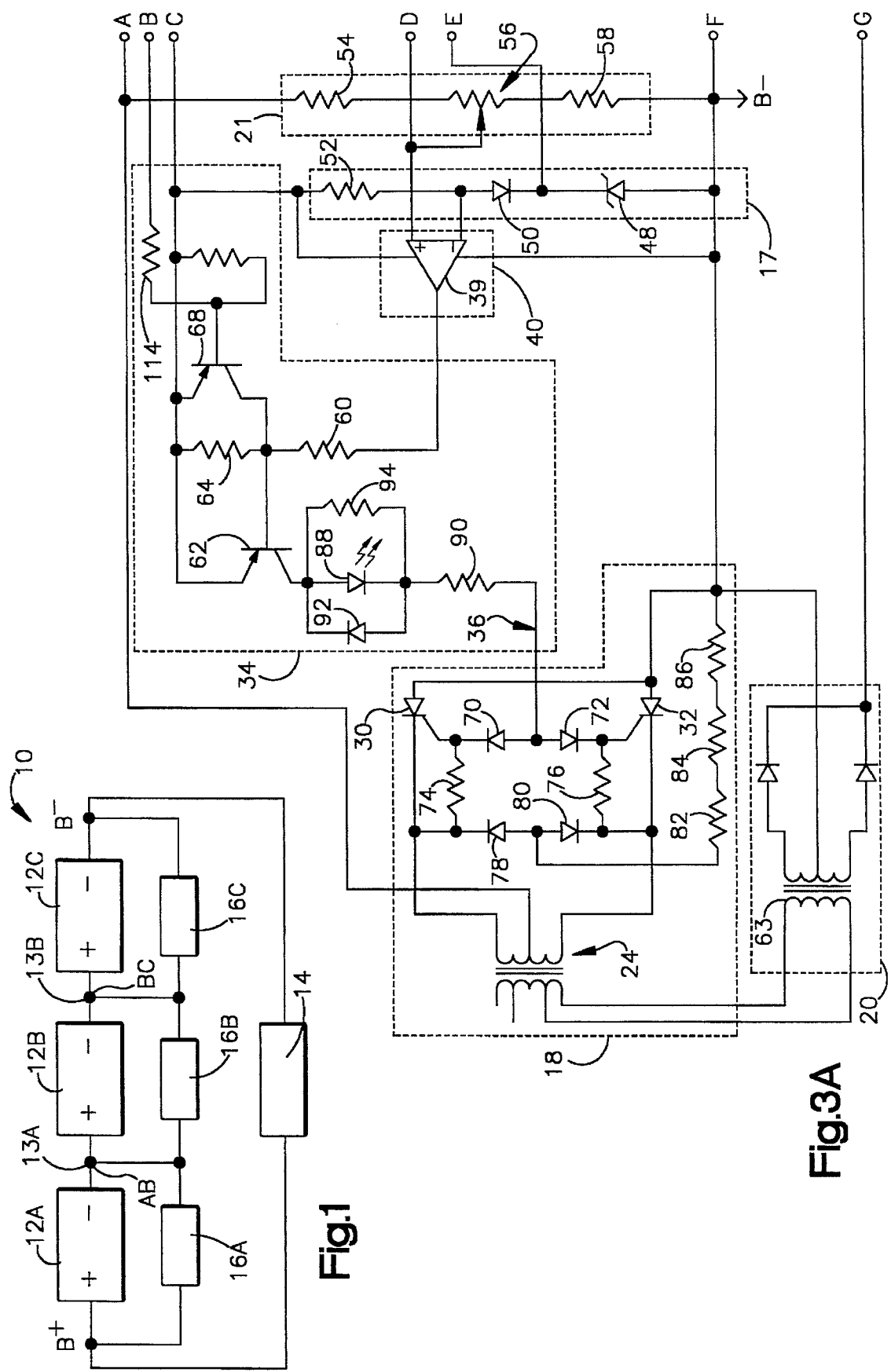
FIG. 1 is a schematic illustration of a compound battery charging system in accordance with the invention.

Referring to FIG. 1, a compound battery charging system 10 is illustrated for charging a string of batteries 12A, 12B, and 12C (12A–12C) connected in series. Each of the batteries 12A–12C can represent an individual battery or a subgroup of batteries. The compound battery charging system 10 includes a system charger 14 and individual battery chargers 16A, 16B, and 16C (16A–16C). In operation, as discussed in detail below, system battery charger 14 charges the whole string of batteries 12A–12C to about 85% of their charge capacity. Then, system charger 14 is turned off and multiple, independent battery chargers 16A–16C separately continue to charge each of the batteries 12A–12C up to approximately 100% capacity.

A principle feature of this invention is system charger 14 which enables the entire string of batteries 12A–12C to be quickly charged up to typically between 70% and 85% of their charge capacity. The additional cost of using small multiple, independent battery chargers 16A–16C is not much greater than a single overall charger. This fact is due to the evolution of electronics over recent decades to a level where the cost of adding functions to a high-power battery charging system does not significantly increase its construction cost. The overriding cost, at the present time, is the expense of handling the energy used for recharging (measured in cost-per-watt). Furthermore, although the cost-per-watt overwhelmingly favors larger power level systems, if a system battery charger 14 is combined with multiple, small, independent battery chargers 16A–16B, which have been optimized to produce the most power for the least cost, the cost contribution of the small battery chargers 16A–16B does not substantially increase the overall cost-per-watt of compound battery charging system 10.

Compound charging system 10 consists of a single, large "system charger" 14 which provides the bulk of the current and power required to charge the entire battery string 12A–12C to a state-of-charge level selected as a compromise between required margins (typically between 70% and 85% state-of-charge) and cost. This level becomes more critical as the batteries age and relates to the cost associated with the ratio of the power capacity of the system charger 14 to the small battery chargers 16A–16C. Generally, the longer the "string", of batteries 12A–12C, i.e., the higher the system voltage, the lower the portion of total charge optimally provided by system charger 14. Batteries used for standby applications receive less of the total charge from system charger 14 but generally have a larger ratio of system charger 14 to battery charger 16A–16C capacity than do similar charger systems for cyclic applications. This discrepancy is due to the fact that substantial charge time is generally available for the last few percent of capacity to be stored.

The partitioning of auxiliary functions may take many forms. For example, "trickle charge" might only be provided by the system charger 14. However, since the circuitry to provide this function is not expensive, it can be provided on both the system charger 14 and on the individual battery chargers 16A–16C, also called subchargers. This feature allows both types of chargers to be used in stand-alone applications which can possibly lead to significant cost savings due to reduction in inventory when a variety of systems are to be configured.

A timing function is generally incorporated in system charger 14, which can then operate as a complete, stand alone charger. Also, battery chargers 16A–16C can operate as simple stand alone chargers which do not incorporate full timing circuits. It is, however, within the terms of the invention to incorporate a timing circuit, as an "add on", to convert a battery charger 16A–16C to a sophisticated, stand alone, battery maintenance device. With the latter, sophisticated battery charge, discharge capability could also be included.

Figure 3B:
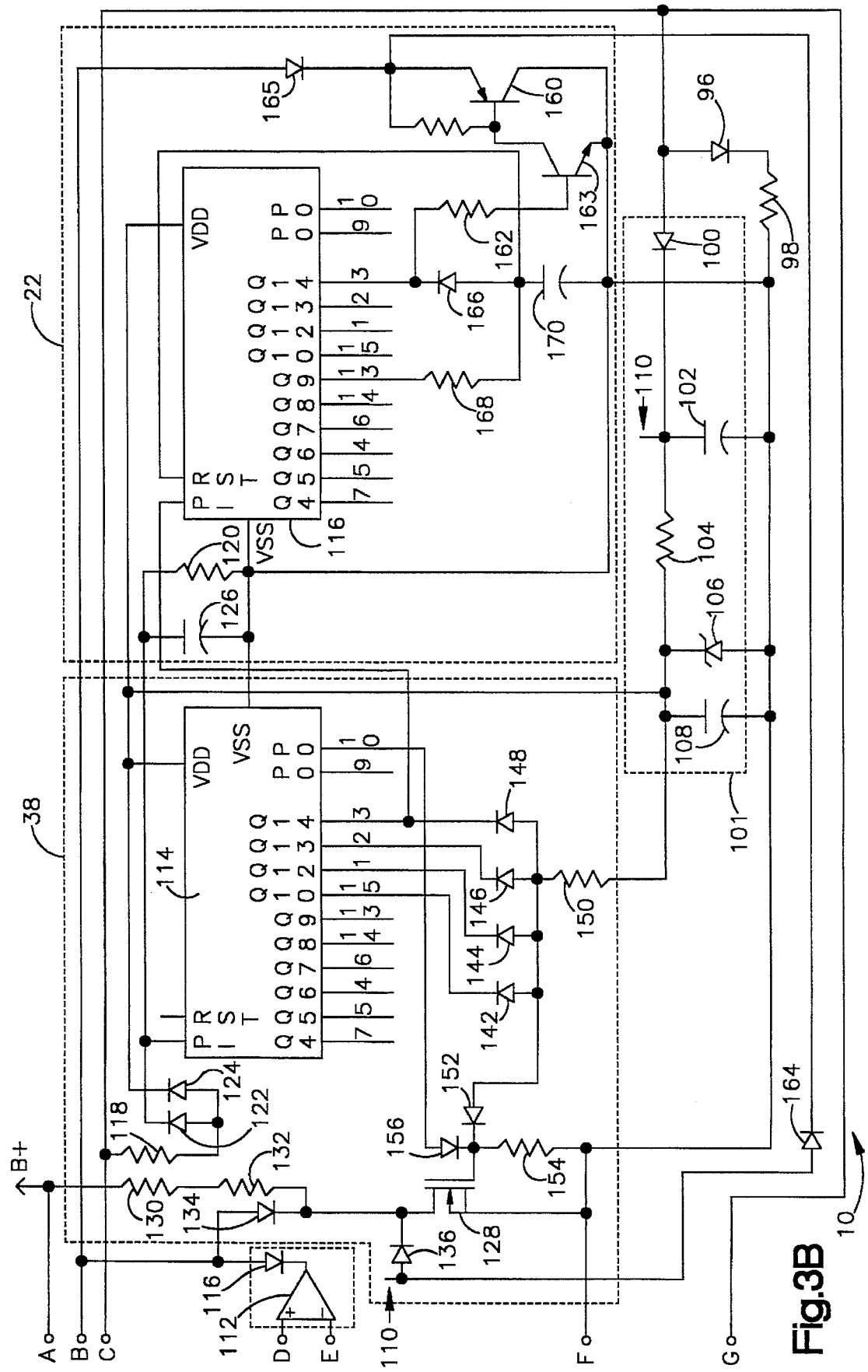

Since the timing circuit in system charger 14 controls discharge and rest time patterns whenever system charger 14 is operating, battery chargers 16A–16C are shut off at this time. A method of sending control signals between system charger 14 and battery chargers 16A–16C is required to insure synchronous operation. An opto-coupler (O.C.) 110, discussed in more detail below, provides a simple, inexpensive, control device, to interface between system charger 14 and any number of battery chargers 16A–16C, independent of their relative position along the string of serial batteries 12A–12C. Note that O.C.$^+$ and O.C.$^-$, as shown in FIGS. 3A and 3B are actually connectors to the ends of daisy chained opto-couplers 110A–110C, as illustrated in FIG. 4 and discussed below. The opto-couplers 110A–110C can be ignored when the battery chargers 16A–16C are used independently.

A description follows of an exemplary charging system which embodies the principles of the present invention. The exemplary system is illustrated in the circuit diagrams of FIGS. 3A, 3B, and 4. The disclosed circuits are provided to demonstrate the operability of the invention, and form an enabling embodiment which is presently the preferred mode. However, other circuit configurations could readily be substituted to accomplish the same functions.

By way of example, battery string 12A–12C can comprise typical traction batteries, such as a battery rated as 36 V and 100 AH for use in a medium sized fork lift. Each battery is typically discharged over two shifts (16 hours), with 8 hours available for recharge, and 5 day-per-week operation. Battery capacity is generally selected for an 85% depth of discharge, to minimize initial cost.

The battery selected can be a sealed, lead acid battery, generally having fairly heavy plates, moderate specific gravity, and a fairly substantial volume of captive electrolytes, i.e., a modestly starved cell design. In this application, a cut-off voltage of 2.45 V/cell is appropriate (at 25° C. with a negative temperature coefficient). There are 18 cells in series in the three batteries 12A–12C. A long term, float voltage of 2.3 V/cell corresponds to approximate 85% initial state-of-charge, at which point charge acceptance effects become dominant. Therefore, system charger 14 will provide a rapidly declining charge contribution to the overall battery string above 85 AH. The remaining 15 AH is provided to each battery individually by battery chargers 16A–16C.

Each battery charger 16A–16C might have a capacity of about 4 amps at 13.8 V (for each 12 volt battery 12A–12C from its own charger 16A–16C). Therefore, the requirement for current from system charger 14 is decreased by 4 amps.

For a set point of 2.45 V/cell (high charge cut-off) for the battery chargers 16A–16C, roughly 4 hours will be required to charge each 12 V battery 12A–12C from 85% to nearly full charge. Therefore, at least 21 amperes must be provided by system charger 14 to reach the required charge state by four hours (4 hours×21 A=84 AH). However, 4 amps of the 21 amps is provided by the individual battery chargers. Therefore, the capacity of the system charger is a minimum of 17 amps.

This illustrates the need for a larger charger capacity in a compound system battery charger 14 than in a simple, prior art system battery charger which would typically provide 14 amps for 8 hours, i.e., 112 AH. The latter type charger was designed to overcharge the string of batteries to assure full capacity, and require make-up water to compensate for the effects of the overcharge.

The compound charging system 10 initially provides a "high" rate of charge during the early stage, i.e., between about 15% to about 85% of full charge. Charging can be at a fast rate during the early stage when the batteries have the greatest capacity to absorb current with least damage. The remaining charge needed to bring the string of batteries up to a full state of charge is provided by a plurality of small battery chargers 16A–16B which provide a modest, closely controlled, "finishing" charge, to each individual battery. The "finishing" charge does not force the batteries into overcharge, or demand make-up water. Therefore, use of sealed cells becomes possible.

The daily recharge cycle, as outlined above, is insufficient to insure total recharge of every cell. The two days when the battery are idle, such as during a weekend, provide time for both the system charger 14 and the individual battery chargers 16A–16C to shut down after the high charge is complete, enabling the trickle charge (perhaps C/500) to "reset" the batteries 12A–12C to 100% state-of-charge on each cell.

The critical point is that a large, economical system charger 14 provides the bulk of the recharge energy, at a higher rate than provided by a conventional single charger, but to a state-of-charge sufficiently low to provide a low risk that any cell will be subject to substantial overcharge. The remaining charge is provided by individual battery chargers which produce an overall battery voltage well above the cut-off of system charger 14. Therefore, the final state-of-charge of each section (each 12 V battery in this case) is characteristic of an individual, very accurate and gentle (C/25 in this illustration) end-of-charge state. The advantages are that substantial water loss can be avoided, despite the fairly rapid recharge requirements, and sealed cells can be employed in a deep cycle application, if appropriately designed.

Figure 2:
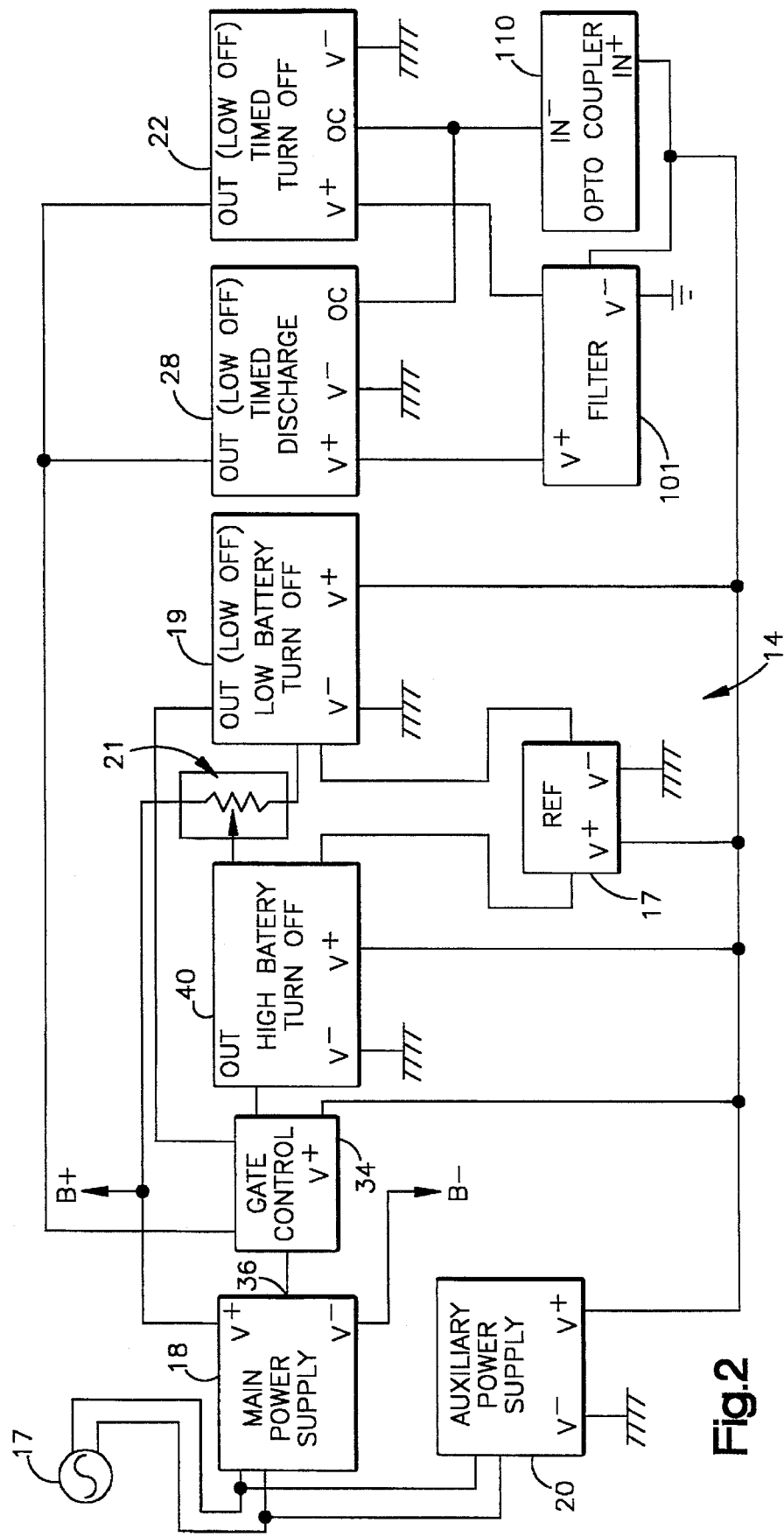
FIG. 2 is a block diagram of a "system charger" in accordance with the present invention.

FIG. 2 is a block diagram of the preferred embodiment of the system charger. In operation, system charger 14 charges all batteries in the system 12A–12C with high current. However, when the battery system's overall voltage is below a set value (typically 70% of cut-off voltage) or above a set value (typically 85% of full charge), system charger 14 switches to restricted charge. Also, system charger 14 will periodically interrupt main charge on a preset timed basis and signal (via the opto-couplers 110) battery chargers 16A–16C to do the same for various intervals, while system charger 14 will partially discharge the batteries 12A–12C.

Main power supply section 18 is powered by line current and has a $V^+$ output which is connected to the positive terminal of the string of batteries 12A–12C at $B^+$. Power supply section 18 has a $V^-$ output, defined as ground, connected to the negative terminal of batteries 12A–12C at $B^-$. The gate input 36 controls the current flowing into $V^-$, the high current for fast charge approximately C/5 in this example) when gate input 36 is high, and trickle charge (typically C/500) when gate input 36 is low.

Gate control section 34 controls the battery charging rate (for either fast charge or slow charge) via gate input 36. Gate control section 34 is connected to high battery turn-off section 40, low battery turn-off section 19, timed discharge section 38, and timed turn-off section 22. The gate control section 34 essentially "OR"s the output of sections 40, 19, 38 and 22 to switch power supply 18 from fast charge to slow charge when either the output of high battery turn-off 19 goes high, or the output of any of the other sections 40, 38 and 22 goes low. The main power section 18 is otherwise set for fast charge.

Voltage divider 21 outputs a voltage proportional to overall battery voltage $B^+$–$B^-$.

Voltage reference section 17 outputs two different stable, reference voltages. A first reference voltage corresponds to a "low battery" voltage, i.e. about 70% of the cut-off voltage of the string of batteries 12A–12C, below which the system charger 14 might be damaged by sustained overload. A second reference voltage corresponds to a "high battery" voltage, i.e. about 85% state-of charge of the string of lead-acid batteries 12A–12C, above which the smaller "sub-chargers" 16A–16C are intended to complete the charging cycle.

Low battery turn-off section 19 compares the overall battery voltage $B^+$—$B^-$ with the first reference voltage. The output of low battery turn-off section 19 is low when the battery voltage is below the first low reference voltage. The low output shifts the main power supply 18 from a fast charge to a small charge. This provides a safe "walk in" charge rate for batteries having a very low voltage. When the overall battery voltage $B^+$-$B^-$ exceeds the low voltage threshold, low battery turn-off section 19 enables fast charging by pulling its output high which in turn permits the output of gate control section 34 to go high.

High battery turn-off section 40 compares the battery voltage with the second higher reference voltage. The output of high battery turn-off section 40 is low when the overall battery voltage $B^+$-$B^-$ is below the second high reference voltage, thus enabling fast charging if not inhibited by turn off section 19, timed discharge section 38, or timed turn-off section 22. When the battery voltage $B^+$-$B^-$ exceeds the second voltage threshold, section 40 causes the main power supply 18 to shift from fast charging to trickle charging, by turning off the output of section 40 which, in turn, removes the output of gate controller 34 at gate input 36.

Opto-coupler 110 is the communication interface between system charger 14 and the individual battery chargers 16A–16C. Opto-coupler 110 is activated by timed discharge section 38 and timed turn-off section 22 to turn off battery chargers 16A–16C.

The timed discharge section 38 is controlled by an internal counter. At various intervals for various durations, timed discharge section 38 turns off main power supply 18 (by switching its output to gate control section 34 from high to low), activates the opto-coupler 110, and sends a discharge current through the batteries 12A–12C.

The timed turn-off section 22 is controlled by an internal counter. At various intervals for various durations, timed turn-off section 22 causes main power supply section 18 to switch from fast charge to trickle charge by switching its output to the gate control 34 from high to low and activating opto-coupler 110.

The auxiliary power supply 20 powers gate control 34, high battery turn-off 40, and low battery turn-off 19. Auxiliary power supply 20 has much lower power capacity than the main power supply 18 because logic circuitry requires much less power than battery charging. Unlike the main power supply 18, its output is continuous and a portion is filtered. The output of auxiliary power supply 20 is filtered by filter section 101. The filtered output powers timed discharge 38 and timed turn-off 22 with filtered, uninterrupted power at their $V^+$. The $V^-$ power inputs of each section in the system 10 are connected together at B– which is defined as system ground, or common.

Referring now to FIG. 3A which is a detailed schematic of the system charger 14 shown in FIG. 2. The main power supply section 18 includes a main transformer 24, with a center-tapped secondary. For example, transformer 24 can have a 90 V center-tapped secondary capable of providing approximately 40 VDC at 20 amperes. The output from transformer 24 is rectified by Screwiest 30 and 32 whenever the gate control section 34 turns on 30 and 32 through line 36.

Diodes 70 and 72 direct the control current from gate control section 34 to Scars 30 or 32. Resistors 74 and 76 are high temperature leakage current protectors for Scars 30 and 32. Diodes 78 and 80 provide rectified "walk-in" or trickle current through resistors 82, 84, and 86 when Scars 30 and 32 are off. Therefore, resistors 82, 84 and 86 provide initial start-up or "walk-in" current when the overall battery voltage $B^+$–$B^-$ is below the safe lower limit of charger operation, as described below.

In the gate control section 34, transistor 62 conducts whenever its base is brought low, thereby turning on fast charge. Light emitting diode (LED) 88 in series with resistor 90 displays the status of power flowing to SCREWIEST drives 30 and 32. Zener diode 92 in the gate control serves to provide gate control current if diode 88 should fail and create an open circuit. Resistor 94 shunts a portion of the current through resistor 90 to bypass LED 88 if the current is beyond the safe limit of LED 88.

The power provided to gate control section 34 is unfiltered and operates synchronously with the A.C. line. This is satisfactory, since gate current to turn on transistor 62 is only required off zero crossing. Near zero crossing, transistor 62 is always off since the output of comparator 39 is unavailable since no power is available to operate the output of comparator 39.

The auxiliary power supply section 20 includes a small transformer 63 with a center-tapped secondary. Typically, transformer 63 can be a 20 V center-tapped secondary rated for 100–300 milliamps.

In voltage reference section 17, zener diode 48, having a low voltage rating with a negative temperature coefficient, maintains a stable reference voltage irrespective of current changes from the batteries 12A–12C. This reference voltage corresponds to "low battery" voltage. The added forward voltage drop of diode 50 provides another stable reference voltage corresponding to "high battery" voltage. Diodes 48 and 50 are powered by current through resistor 52.

In the high battery turn-off section 40, comparator 39 compares the "high battery" reference voltage to the overall battery voltage $B^+$–$B^-$ proportionally reduced through resistor divider 54, 56, and 58. In operation, when the overall battery voltage $B^+$–$B^-$ is below the "high battery" reference voltage, the output of comparator 39 goes low to turn on transistor 62 by providing current through resistor 60. Resistor 64 acts as a high temperature leakage control resistor. Transistor 62 then sends current through LED 88 (thereby lighting it) and resistors 94 and 90 and diodes 70 and 72. Finally the current from transistor 62 is delivered to the gates of SCRs 30 and 32 to turn them on, which then completes current from the battery $B^-$ for fast charging the battery system.

Conversely, when the overall battery voltage is above the "high battery" reference voltage, the output voltage of comparator 39 goes high and transistor 62 ceases conduction. Lacking gate current, Screwiest 30 and 32 also turn off, and only trickle current through resistors 82, 84 and 86 charges the battery.

Transistor 68 is a clamp to cut off drive current to SCRs 30 and 32. Resistor 66 is the high temperature leakage control resistor for transistor 68.

In the low battery turn-off section 19, comparator 112 compares the "low battery" reference voltage to the overall battery voltage $B^+$–$B^-$, proportionally reduced through resistor divider 54, 56, and 58. In operation, when overall battery voltage $B^+$–$B^-$ is below the "low battery" threshold voltage, the output of comparator 112 goes low, pulling current through diode 116 and resistor 114 to provide current to the base of transistor 68. Transistor 68 is thereby turned on, and it clamps the base of transistor 62 off, thereby turning it off and halting the current flow to the gates of SCRs 30 and 32. Lacking gate current, SCRs 30 and 32 also turn off, and only a restricted current through resistors 82, 84 and 86 charges the string of batteries. This prevents system charger 14 from overheating and provides a safe "walk-in" current until the system voltage reaches a safe level.

Conversely, when battery voltage exceeds the "low battery" reference voltage, the output of comparator 112 goes high and ceases providing current to the base of transistor 68. With clamp transistor 68 being no longer turned on, there is no effect on transistor 62, and fast charge can occur through SCRs 30 and 32.

Referring now to FIG. 3B, filter section 101 regulates and filters the voltage from auxiliary power supply 20 to power turn-off sections 22 and 38. LED 96 and series current control resistor 98 display A.C. power. Diode 100 isolates capacitor 102 the primary power supply filter for control section 22, timed discharge section 38 and O.C$^+$. Resistor 104, zener diode 106, and capacitor 108 form a regulated power source. In addition, capacitor 102 provides a power source for the input diodes of the opto-couplers 110 used to transmit shut down instructions to the individual battery chargers 16A–16C, as discussed below.

Timed sections 38 and 22 are controlled by 4060 CMOS counter integrated circuits 114 and 116 consisting of 14 stage binary counters preceded by two accessible sequential input inverters, ganged together. Resistors 118 and 120 form a voltage divider which provides a 120 hz input from the A.C. auxiliary power supply line to the input of counter 114. Diodes 122 and 124 provide offset compensation to prevent input PI of integrated circuit 114 from exceeding VDD by more than a few millivolts. Capacitor 126 is a noise filter.

The input of a field effect transistor (FET) 128 receives an approximate 1 millisecond (duration) pulse centered on each A.C. line zero crossing from the output of the first input inverter PO of counter 114 through diode 156. When FET 128 responds to the voltage at the gate, it conducts current so that A) battery discharge current is drawn from the $B^+$ side of the string of batteries 12A–12C through resistors 130 and 132, B) SCRs 30 and 32 are inhibited through diode 134, resistor 114, transistor 68, transistor 62, etc., C) the negative output of opto-coupler 110 is activated through diode 136.

Diodes 142, 144, 146, and 148 combine to pull down the voltage from pull-up resistor 150, which independently turns on FET 128 through diode 152. Resistor 154 pulls down the gate of FET 128 when neither diodes 156 nor 152 provide a positive input. Since counter 114 does not provide a Q11 output for diode 142, Q10 is used instead. The result is two, roughly two-second pulses separated by roughly two seconds every approximately two minutes, instead of a single four second pulse in the example shown.

Referring to timed turn-off section 22, counter 116 counts the output of counter 114. After every $2^{13}$ counts (approximately 350 hours), timed turn-off section 38 will turn on transistor 160 through resistor 162 and transistor 163 which will, in turn: A) turn off SCRs 30 and 32 through resistor 114, transistor 68, and transistor 62 via diode 156; and B) operate the negative input of opto-coupler 110 through diode 164. Diode 166 is a clamp on the reset of counter 116 through resistor 168 and noise filter capacitor 170 until output Q14 of counter 116 is positive. Note that FET 128 is not operated by counter 116. Therefore, the string of batteries 12A–12C are not discharged and "rest"

with only "trickle charge" flowing. This illustrates that pulse patterns involving different durations and repetition rates and providing both discharge and rest periods may be easily implemented.

Approximately 10 hours later, output Q9 goes positive resetting counter 116 and returning system 10 to normal operation. The values shown are actually suitable for long term standby operation. For the 8 hour charge cycle used in a traction battery, the input to counter 116 would be taken from the Q6 output of counter 114 reducing the cycle time approximately 1 hour and the "rest" to approximately 2 minutes. While this is not sufficient time for full re-equilibration, it represents an example of an effective and efficient compromise.

By selecting the output set of counter 114 and the output from 114 to counter 116, along with the output and reset source output of 114, a very wide variety of time patterns can be selected to customize the system for specific applications.

Referring to FIG. 4, there is shown a schematic of an individual battery charger 16A. Each battery 12A–12C in the system 10 has its own such battery charger 16A–16C connected to each of the serially connected batteries 12A–12C. Since the individual battery chargers 16A–16C are substantially identical, only one charger 16A is discussed in detail. In operation, the system charger 14 signals the battery chargers to stop fast charging leaving only trickle charging in operation via the opto-coupler 110 provided in the circuitry of each battery charger 16A–16C. Each battery charger 12A monitors battery voltage of the specific battery across which it is attached. Each battery is charged with a restricted current when that specific battery voltage is either below a minimum, or above a maximum, or when system charger 14 signals it to do so by powering the daisy-chained opto-couplers 110. Otherwise, charger 12A charges the battery at a normal rate.

The power supply section 189 includes an isolated A.C. line transformer 190 with a center-tapped secondary, typically having a voltage of 30 V. Parallel diodes 192, 194, 196, and 198 provide full-wave rectification. Diodes 214 and 216 similarly provide a full wave rectified "offset" or "auxiliary" power source of opposite polarity to the main power source. The rectifier branch that carries the greater current has diodes shown in parallel pairs to increase current capacity.

A resistor divider 243, comprised of resistors 244, 242 and 240, provides a voltage (proportional to battery voltage $B^+-B^-$) to comparator 228. Zener diode 238 and resistor 246 provide a stable reference voltage corresponding to high-battery cutoff voltage.

When the battery voltage $B^+-B^-$ is below the reference voltage, the output of comparator 228 goes low, causing transistor 204 to conduct current through LED 206. LED lights up as the current flows through resistors 208 and 202 to turn on SCR 200 and provide current to the negative terminal of battery 12A through diodes 234, 232 and 230 (in parallel to increase current capacity) from the center tap of power transformer 190. The result is a fast charge of battery 12A. Resistor 212 is the high temperature leakage control resistor for SCR 200.

Conversely, when the battery voltage exceeds the reference voltage, the output of comparator 228 goes high, turning off transistor 204 since current flow through resistor 236 ceases, which in turn turns off SCR 200. Fast charge ceases, although the battery 12A still receives a small trickle current through diodes 230, 232, 234, 226, and resistor 223 finally to the centertap of transformer 190 and also through resistor 222 to the V- output from diodes 214, 216.

Opto-coupler 110 enables the system battery charger 14 to override the comparator process described above. Each battery charger 16A–16C has its own opto-coupler 110A, 110B, 110C, respectively, comprising a current limiting resistor 184, an LED 182, and a photo transistor 252 and leakage control resistor 254. The opto-couplers 110A–110C of successive battery chargers 16A–16C are daisy-chained in parallel, so that system charger 14 controls all of them simultaneously. Each opto-coupler 110a–110C input section has twin connectors, i.e., 111A, 113A which are daisy chained together. Therefore, all the opto inputs are connected to $O.C.^+$ and $O.C.^-$.

In operation, when the system charger 14 powers the input of opto-couplers 110A–110C, photo-transistor 252 is turned on, raising the noninverting input of comparator 228 high, which brings the comparator output high to turn off the fast charge and leave only trickle charge.

Resistor 248 provides sufficient impedance for the output of photo-transistor 252 and leakage control resistor 254, to clamp the non-inverting input of 228 (in response to signals issued by the system charger timing system) and remove the drive to SCR 200.

Zener diode 210 conducts some of the current in case LED 206 should fail and leave an open circuit. Resistor 212 provides thermal leakage current control for SCR 200. LED 218 with current limiting resistor 220 indicates when the circuit is powered. Diode 252 provides reverse battery polarity isolation.

The off-set supply also powers comparator 228 with diodes 226 and 229 to provide reverse battery installation protection and preventing any power from being drawn from the battery 16A, if A.C. power is lacking. This function is duplicated by diodes 230, 232, and 234 which are connected in parallel for thermal design convenience. Diodes 230, 232, and 234 isolate battery charger 16A from the system charger 14 if the battery 14A connected to battery charger 16A were to become disconnected or fail with an open circuit.

The voltage drop of diode 249 combined with the base emitter voltage of transistor 204, act as a voltage reference for resistor divider comprising resistors 203 and 236. Since the power to comparator 228 is clamped to $B^-$ via diode 226, this provides a simple method of setting a minimum voltage below which the charger cannot operate to prevent overheating due to a short or a very low voltage battery. Below the minimum voltage, battery current is provided by resistors 222 and 223. Resistor 223 contributes relatively little to trickle above high charge cut-off (14.7 volts is a typical value in the example discussed), but significantly during "walk-in." Capacitor 260 simply sets the frequency response range of comparator 228.

At the other end of the compound charger spectrum might be a standby battery system for an emergency inverter of say several hundred volts. The system charger would be adjusted to a cut-off charge of perhaps 2.23 to 2.27 V per cell, with the "subcharger" battery voltage set to 2.30 V per cell. Since 24 hours is generally allowed for substantial recharge, the individual battery chargers could be relatively small. The system charger 14 would typically be in the C/20 range or smaller and the individual battery chargers C/40 or smaller.

Each application provides a unique set of requirements and priorities. The compound charge concept is sufficiently flexible to allow systems to be configured in a cost effective configuration to meet individual requirements. This might vary form a single battery system charger acting as a stand-alone providing a triple pulse pattern to enhance cycle or standby performance, to a low cost system where a single "sub-battery" charger is used stand-alone to charge one or more batteries, to very large systems in which several compound chargers might be combined to charge subsets of a very high voltage battery system "piece-wise", i.e. a "multiple compounded" system. In a sense, a compound charger system or even a compound/compound system could be applied.

The basic concept of bulk power provided by chargers of sufficient size to exploit the economy of scale, combined with small chargers to provide the advantages of individual battery (or small group or even individual cell) control at relatively low power is the most general concept of the invention. When combined with reverse pulse operation (with durations longer and shorter) than the "time constants" of the cells, and possibly rest periods, the flexibility of the disclosed compound charger becomes apparent to one skilled in the art.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

I claim:

1. A compound charging system for charging a plurality of batteries serially connected to each other, comprising:
   a system charger connected across said plurality of batteries for charging said plurality of batteries in response to the overall voltage across said plurality of batteries; and
   a plurality of individual battery chargers each connected across a corresponding one of said plurality of batteries for independently charging said corresponding one of said plurality of batteries in response to the voltage across said corresponding one of said plurality of batteries.

2. The compound battery charging system of claim 1 wherein said system charger includes first control means for delivering a full charging current to said plurality of batteries whenever said overall voltage across said plurality of batteries is at a first value above a second value corresponding to below about 70% of said plurality of batteries cut-off voltage and below a third value corresponding to about 85% of said plurality of batteries full charge capacity.

3. The compound battery charging system of claim 2 wherein said system charger delivers a walk-in charging current to said plurality of batteries whenever said overall voltage across said plurality of batteries is at said second value.

4. The compound battery charging system of claim 3 wherein said system charger delivers a trickle charging current to said plurality of batteries whenever said overall voltage across said plurality of batteries is at said third value.

5. The compound charging system of claim 1 wherein said plurality of individual chargers each includes first individual control means for delivering individual full charging current to said corresponding one of said plurality of batteries whenever said individual voltage across said corresponding one of said plurality of batteries is at first value above a second value corresponding to below about 70% of said corresponding one of said plurality of batteries cut-off voltage and below a third value corresponding to above about 100% of said corresponding one of said plurality of batteries full charge voltage.

6. The compound battery charging system of claim 5 wherein said plurality of individual battery chargers each delivers individual walk-in charging current to said corresponding one of said plurality of batteries whenever said individual voltage across said corresponding one of said plurality of batteries is at said second value.

7. The compound charging system of claim 6 wherein said plurality of individual chargers each delivers individual trickle charging current to said corresponding one of said plurality of batteries whenever said individual voltage across said corresponding one of said plurality of batteries is at said third value.

8. The compound charging system of claim 7 wherein said plurality of individual battery chargers each include second individual control means for shutting off said individual battery chargers for a time interval corresponding to a time interval that said system charger is partially discharging said plurality of batteries.

9. The compound charging system of claim 1 wherein said plurality of individual battery chargers each includes individual control means for shutting off said individual battery chargers for a time interval corresponding to a time interval that said system charger is partially discharging said plurality of batteries.

10. The compound charging system of claim 2 wherein said plurality of individual battery chargers each includes first individual control means for delivering individual full charging current to said corresponding one of said plurality of batteries whenever said voltage across said corresponding one of said plurality of batteries is at a fourth value above a fifth value corresponding to below about 70% of said corresponding one of said plurality of batteries cut-off voltage and below a sixth value to above about 100% of said corresponding one of said plurality of batteries full charge voltage.

11. The compound charging system of claim 10 wherein said plurality of individual battery chargers each independently deliver individual walk-in charging current to each of said corresponding one of said plurality of batteries whenever said individual voltage across said corresponding one of said plurality of batteries is at said fifth value.

12. The compound charging system of claim 11 wherein said plurality of individual battery chargers each deliver individual trickle charging current to said corresponding one of said plurality of batteries whenever said individual voltage across said corresponding one of said plurality of batteries is at said sixth value.

13. The compound charging system of claim 10 wherein each of said plurality of individual battery chargers includes second individual control means for shutting off said plurality of individual battery chargers for a time interval corresponding to a time interval that said system charger is partially discharging said plurality of batteries.

14. The compound charging system of claim 13 wherein said system charger delivers walk-in charging current when said overall voltage across said plurality of batteries are at said second value and trickle charging current when said plurality of batteries are at said third value.

15. The compound charging system of claim 14 wherein said walk-in charging current and said trickle charging current have a value of between about C/200 and C/1000.

16. The compound charging system of claim 15 wherein said plurality of individual battery chargers deliver individual walk-in charging current to said corresponding one of said plurality of batteries whenever said voltage across said corresponding one of said plurality of batteries is at said fifth value and individual trickle charging current whenever said voltage across said corresponding one of said plurality of batteries is at said sixth value.

17. The compound charging system of claim 16 wherein said individual trickle charging current and said individual walk-in charging current have a value of between about C/200 and C/1000.

18. The compound charging system of claim 17 wherein said individual full charging current has a value of less than about C/40.

19. A method of charging a plurality of batteries serially connected to each other, comprising the steps of:

charging said serially connected plurality of batteries with full charging current from a system charger when the overall voltage across said serially connected plurality of batteries is between a first reference voltage and a second reference voltage higher than said first reference voltage; and independently charging one of said plurality of batteries with individual fall charging current from a corresponding one of a plurality of individual battery chargers each connected across a corresponding one of said plurality of batteries when the voltage across said corresponding one of said plurality of batteries is between a third reference voltage and a higher fourth reference voltage corresponding to about 100% of the full charge voltage of said corresponding one of said plurality of batteries.

20. The method of claim 19 including the step of delivering said full charging current to said serially connected plurality of batteries whenever said first reference voltage is above about 70% of said cut-off voltage across said serially connected plurality of batteries and said second reference voltage corresponds to below about 85% of the full charge capacity across said serially connected plurality of batteries.

21. The method of claim 20 including the step of delivering a walk-in charging current to said serially connected plurality of batteries whenever said overall voltage across said serially connected plurality of batteries is at said first reference voltage corresponding to below about 70% of said serially connected plurality of batteries cut-off voltage.

22. The method of claim 21 including the step of delivering a trickle charging current to said plurality of serially connected batteries whenever said overall voltage across said serially connected plurality of batteries is at said second reference voltage.

23. The method of claim 22 including the step of independently delivering individual walk-in charging current to said corresponding one of said plurality of batteries whenever said individual voltage across said one corresponding of said plurality of batteries is at said third reference voltage corresponding to below about 70% of said corresponding one of said plurality of batteries cut-off voltage.

24. The method of claim 23 including the step of delivering individual trickle charging current to said one corresponding of said plurality of batteries whenever said individual voltage across said one corresponding of said plurality of batteries is at said fourth reference voltage.

25. The method of claim 24 including the step of shutting off said plurality of individual battery chargers for a time interval corresponding to a time interval that said serially connected plurality of batteries are being partially discharged by said system charger.

26. The method of claim 19 further including the step of shutting off said/plurality of individual battery chargers for a time interval corresponding to a time interval that said serially connected plurality of batteries are being partially discharged by said system charger.

27. The method of claim 20 including the step of independently delivering individual walk-in charging current to said corresponding one of said plurality of batteries whenever said voltage across said corresponding one of said batteries is at said third reference voltage corresponding to below about 70% of said corresponding one of said plurality of batteries cut-off voltage.

28. The method of claim 27 including the step of independently delivering individual trickle charging current to said corresponding one of said plurality of batteries whenever said individual voltage across said corresponding one of said plurality of batteries is at said fourth reference voltage.

29. The method of claim 28 further including the step of shutting off said plurality of individual battery chargers for a time interval corresponding to a time interval that said serially connected plurality of batteries are being partially discharged by said system charger.

30. The method of claim 29 including the step of selecting said walk-in charging current and said trickle charging current with a value of between about C/200 and C/1000.

31. The method of claim 30 including the step of selecting said individual walk-in charging current and said individual trickle charging current with a value of between about C/200 and C/1000.

32. The method of claim 31 including the step of selecting said individual full charging current with a value of less than C/40.

\* \* \* \* \*